(12) United States Patent
Kawano

(10) Patent No.: US 8,223,370 B2
(45) Date of Patent: Jul. 17, 2012

(54) INFORMATION PROCESSING SYSTEM, PROGRAM, RECORDING MEDIUM, AND HISTORY INFORMATION DISPLAYING METHOD

(75) Inventor: Shinichi Kawano, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 917 days.

(21) Appl. No.: 12/291,636

(22) Filed: Nov. 12, 2008

(65) Prior Publication Data

US 2009/0122342 A1    May 14, 2009

(30) Foreign Application Priority Data

Nov. 13, 2007    (JP) ................................ 2007-294418

(51) Int. Cl.
*G06F 3/12*      (2006.01)
(52) U.S. Cl. ....... 358/1.15; 358/1.1; 358/1.13; 709/206; 715/700; 715/835; 715/838
(58) Field of Classification Search .................. 358/1.1, 358/1.13, 1.15; 709/206; 715/700, 835, 715/838
See application file for complete search history.

(56) References Cited

U.S. PATENT DOCUMENTS

2007/0223013 A1    9/2007   Mizutani

FOREIGN PATENT DOCUMENTS

| JP | 03-234168 | | | 10/1991 |
|---|---|---|---|---|
| JP | 05-219291 | | | 8/1993 |
| JP | 05219291 | A | * | 8/1993 |
| JP | 09-294198 | | | 11/1997 |
| JP | 2000-232570 | | | 8/2000 |
| JP | 2005-204018 | | | 7/2005 |
| JP | 2006-135597 | | | 5/2006 |
| JP | 2006135597 | A | * | 5/2006 |
| JP | 2007-053583 | | | 3/2007 |
| JP | 2007-116379 | | | 5/2007 |
| JP | 2007116379 | A | * | 5/2007 |
| JP | 2007-164632 | | | 6/2007 |
| JP | 2007164632 | A | * | 6/2007 |
| JP | 2007-259352 | | | 10/2007 |
| JP | 2007-266893 | | | 10/2007 |

* cited by examiner

*Primary Examiner* — Jacky X Zheng
(74) *Attorney, Agent, or Firm* — Edwards Wildman Palmer LLP; David G. Conlin; David A. Tucker

(57) ABSTRACT

When a transmission history such as a job is displayed, specific information is quickly retrieved from the transmission history by displaying an image included in the transmission history as a thumbnail. An information processing system includes an MFP that includes a function of transmitting image data and a client PC that instructs transmission of the image data to the MFP and the MFP and the client PC are connected to each other through a network. The client PC includes an HDD that stores therein, for each transmission job, a transmission history that includes image data that the client PC instructs the MFP to transmit, a history data creating portion that creates a thumbnail image by converting the image data of the stored transmission history into a thumbnail, and a display data control portion that causes the thumbnail image created by the history data creating portion to be displayed.

15 Claims, 16 Drawing Sheets

FIG.6

```
RETRIEVAL CONDITION INPUT

RETRIEVAL
CONDITION: [          ]

[ RETRIEVAL ] [ CANCELLATION ]
```

FIG.7

```
NAME AND STORE

NAME OF TAB
TO BE STORED: [          ]

[ OK ] [ CANCELLATION ]
```

FIG.8

```
RE-TRANSMISSION

RE-TRANSMIT FAILED JOB ?

[ YES ] [ NO ]
```

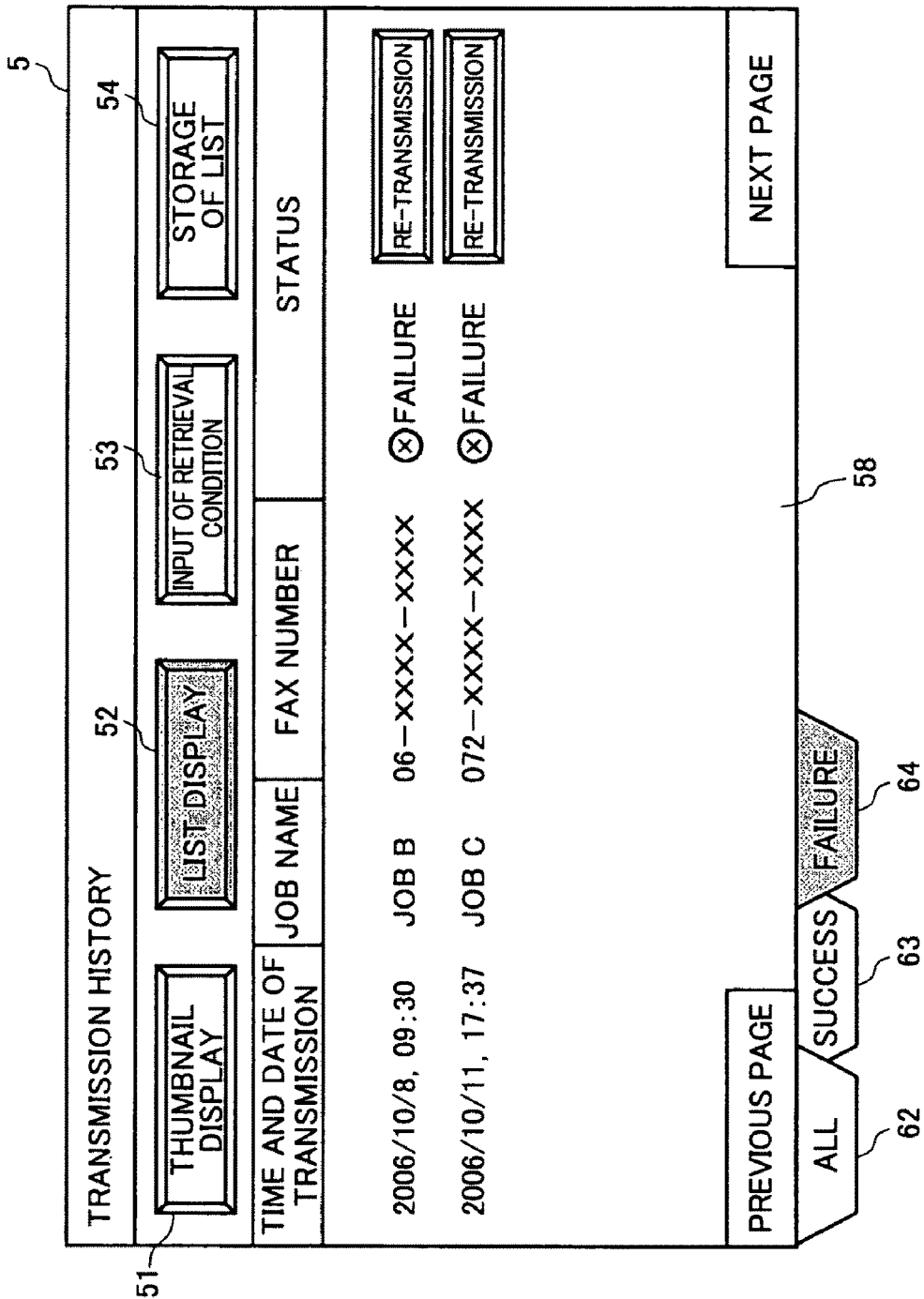

INFORMATION PROCESSING SYSTEM, PROGRAM, RECORDING MEDIUM, AND HISTORY INFORMATION DISPLAYING METHOD

CROSS-NOTING PARAGRAPH

This Nonprovisional application claims the benefit of priority under 35 U.S.C. §119(a) on Patent Application No. 2007-294418 filed in JAPAN on Nov. 13, 2007, the entire contents of which are hereby incorporated herein by reference.

FIELD OF THE INVENTION

The present invention relates generally to an information processing system, a program, a recording medium, and a history information displaying method, and more particularly, to an information processing system, a program, a recording medium, and a history information displaying method for displaying a transmission history as a thumbnail or by distinguishing it using the transmission result, etc., when a facsimile job, etc., are transmitted.

BACKGROUND OF THE INVENTION

Conventionally, a facsimile apparatus including a function of outputting a communication management report is known. With this communication management report, a user can check the communication result, the number of pages, the time and date of the communication, the time period necessary for the communication, etc., of a facsimile. For example, Japanese Laid-Open Patent Publication No. 2000-232570 describes such a facsimile apparatus that has stored therein a transmission history including a transmitted image of a facsimile and that enables a user to retrieve the transmitted image using this transmission history.

The facsimile apparatus described in the above Japanese Laid-Open Patent Publication No. 2000-232570 stores picture information of a document read by a scanner and adds title information (the name of the item) to the picture information. In addition, it makes possible to output a communication management report that has the name of the item transmitted and retrieve the picture information transmitted by creating communication management information indicative of a transmission history including code information of the title information and storing the picture information transmitted and its code information by equating with each other.

However, though the facsimile apparatus of the above Japanese Laid-Open Patent Publication No. 2000-232570 is able to retrieve specific information from a plurality of transmission histories described in a communication management report using the title information as a retrieval key, the cases where a user forgets the title information or where the transmission content can not be identified from the title information arise when a lot of transmission histories are accumulated. In these cases, a problem arises that it takes a long time for a user to retrieve desired information.

SUMMARY OF THE INVENTION

An object of the present invention is to provide an information processing system, a program, a recording medium, and a history information displaying method for enabling quick retrieval of specific information from the transmission histories when the transmission histories such as a facsimile job, etc., are displayed by displaying an image included in a transmission history as a thumbnail or by displaying transmission histories in a history list to display according to a specific condition such as the transmission result or the like.

Another object of the present invention is to provide the information processing system comprising an image forming apparatus that comprises a function of transmitting image data, and an information processing apparatus that instructs the image forming apparatus to transmit the image data, both of which are connected through a network, wherein the information processing apparatus comprises: a transmission history storing portion that stores, for each transmission job, a transmission history that includes image data which the information processing apparatus instructs the image forming apparatus to transmit; a history data creating portion that creates a thumbnail image by converting the image data of the stored transmission history into a thumbnail; and a display data control portion that causes the thumbnail image created by the history data creating portion to be displayed.

Another object of the present invention is to provide the information processing system, wherein when the display data control portion causes the thumbnail image created by the history data creating portion to be displayed, the display data control portion causes transmission history information that includes any one or more of the time and date of transmission, the job name, destination address information, and the transmission result of the image data that corresponds to the thumbnail image, to be concurrently displayed.

Another object of the present invention is to provide the information processing system, wherein in the case where the display data control portion causes the thumbnail image created by the history data creating portion to be displayed, the display data control portion causes, when a first piece of the image data that corresponds to the thumbnail image is a cover letter, thumbnail images of a second piece and the following pieces of image data to be displayed.

Another object of the present invention is to provide the information processing system, wherein the display data control portion causes, when the thumbnail image created by the history data creating portion is unable to be displayed in one screen, the thumbnail image to be scrollably displayed.

Another object of the present invention is to provide the information processing system, wherein when the display data control portion causes the thumbnail image created by the history data creating portion to be displayed, the display data control portion causes the thumbnail image to be displayed by coloring it for each transmission result state that corresponds to the thumbnail image.

Another object of the present invention is to provide the information processing system, wherein the history data creating portion makes a history list of information concerning the transmission history stored in transmission history storing portion, and the display data control portion, when the display data control portion causes the history list created by the history data creating portion to be displayed, causes the transmission histories of the history list to be displayed by classifying them according to the state of the transmission result.

Another object of the present invention is to provide the information processing system, wherein the display data control portion causes the transmission histories of the history list to be displayed by classifying them using a tab for each transmission result state of the transmission history.

Another object of the present invention is to provide the information processing system, wherein the display data control portion causes the transmission histories of the history list to be displayed by coloring them differently according to each transmission result state of the transmission history.

Another object of the present invention is to provide the information processing system, wherein the transmission result state is the state that the image forming apparatus succeeded or failed to transmit the image data.

Another object of the present invention is to provide the information processing system, wherein the display data control portion causes, together with the history list, a re-transmission key that enables re-transmission of the image data that the image forming apparatus failed to transmit, to be displayed.

Another object of the present invention is to provide the information processing system, wherein the display data control portion causes, together with the history list, a transmission destination changing key that enables transmission of the image data that the image forming apparatus succeeded to transmit by changing the transmission destination to another transmission destination, to be displayed.

Another object of the present invention is to provide the information processing system, wherein the information processing apparatus comprises a transmission history retrieving portion that retrieves a transmission history of the history list based on any one or more of the time and date of transmission, the job name, destination address information, and the transmission result as the retrieval condition(s).

Another object of the present invention is to provide the information processing system, wherein the display data control portion causes the transmission history acquired by retrieval of the transmission history retrieving portion to be displayed by classifying it using another tab that is different from the above described tab.

Another object of the present invention is to provide the information processing system, wherein the history data creating portion creates a thumbnail image by converting the image data of the transmission history acquired by retrieval of the transmission history retrieving portion into a thumbnail.

Another object of the present invention is to provide the information processing system, wherein the image forming apparatus transmits the image data by facsimile.

Another object of the present invention is to provide the information processing system, wherein the image forming apparatus transmits the image data by e-mail.

Another object of the present invention is to provide the information processing system, wherein the information processing apparatus is a server apparatus that is connected to a plurality of client terminals through the network, and the display data control portion causes a displaying portion of any one of the client terminals to display the thumbnail image or the history list created by the history data creating portion in response to a request to display the transmission history from the client terminal.

Another object of the present invention is to provide a program to cause a computer to realize the function as the information processing apparatus of the information processing system.

Another object of the present invention is to provide a computer readable recording medium storing the program.

Another object of the present invention is to provide a history information displaying method for an information processing system comprising an image forming apparatus that comprises a function of transmitting image data, and an information processing apparatus that instructs the image forming apparatus to transmit the image data, both apparatuses are connected through a network, comprising the steps of: acquiring, for each transmission job, a transmission history that includes the image data that the information processing apparatus instructs the image forming apparatus to transmit; creating a thumbnail image by converting the image data of the acquired transmission history into a thumbnail; and causing the created thumbnail image to be displayed.

BRIEF DESCRIPTION OF THE DRAWINGS

FIG. 6 depicts an example of a retrieval condition input screen displayed on the client PC;

FIG. 7 depicts an example of a list storage screen displayed on the client PC;

FIG. 8 depicts an example of a re-transmission instruction screen displayed on the client PC;

FIGS. 12A and 12B respectively depict other exemplary screens displayed when a history list of transmission histories is displayed on the client PC;

PREFERRED EMBODIMENTS OF THE INVENTION

Referring to the accompanying drawings, description will hereinbelow be made of preferred embodiments of an information processing system, a program, a recording medium, and a history information displaying method of the present invention. The embodiments below are examples that embody the present invention, and are not intended to limit the technical scope of the present invention.

Figure 1:
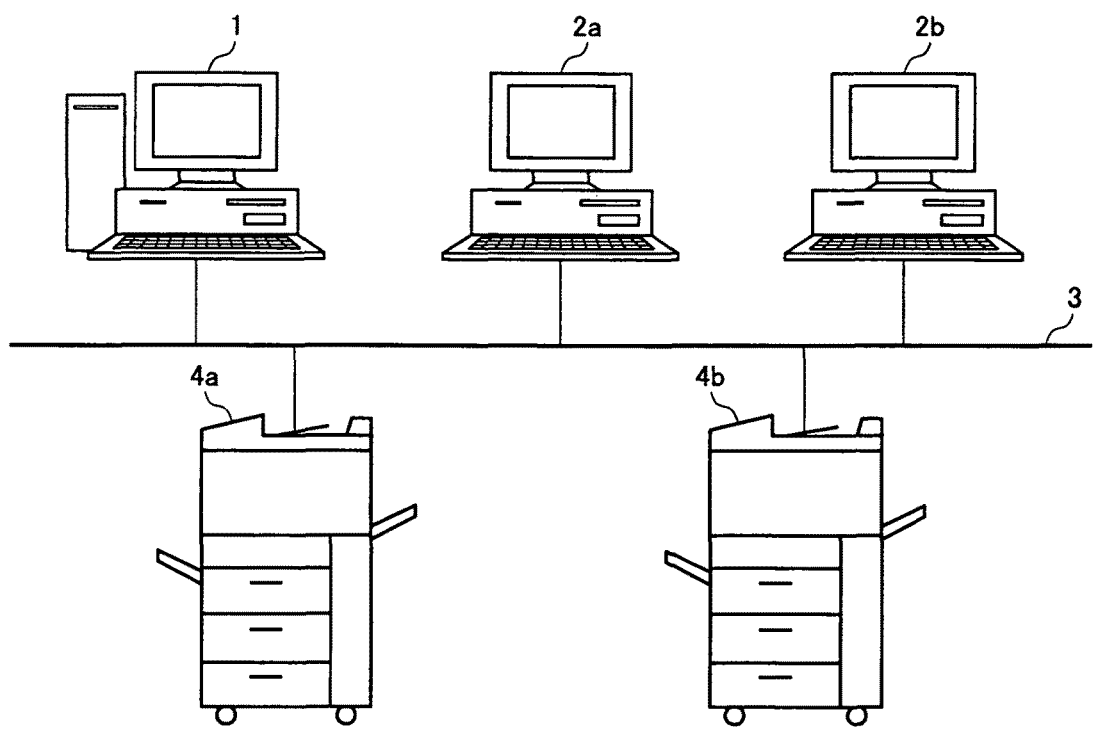
FIG. 1 depicts an exemplary configuration of an information processing system according to an embodiment of the present invention.

FIG. 1 depicts an exemplary configuration of an information processing system according to an embodiment of the present invention. In FIG. 1, "1" denotes a server apparatus, "2a" and "2b" denote client PCs, "3" denotes a network, and "4a" and "4b" denote MFPs (Multi-Function Peripherals). The server apparatus 1 and the client PCs 2a and 2b (hereinafter, collectively "client PC 2") are general purpose personal computers. The MFPs 4a and 4b (hereinafter, collectively "MFP 4") are multi-function peripherals including a scanner function, a copying function, a printer function, a facsimile (FAX) function, an electronic mail function, and so on.

An information processing apparatus according to the present invention may be either the client PC 2 or the server apparatus 1. However, when the information processing apparatus is applied to the client PC 2, the server apparatus 1 may be omitted. In the embodiment, the server apparatus 1, the client PC 2, and the MFP 4 are communicably connected through the network 3 such as a LAN (Local Area Network) according to, for example, IEEE 802.3.

When FAX transmission is executed using the information processing system of the embodiment, the client PC 2 transmits image data for the FAX transmission to the server apparatus 1, and the server apparatus 1 creates a FAX job of the image data and transmits the FAX job to the MFP 4 through the network 3. The MFP 4 receives the Fax job and transmits a facsimile to the destination being set.

The communication environment may be a communication environment that is not through the server apparatus 1. In this case, the client PC 2 creates the FAX job directly from the image data for the FAX transmission, and transmits the FAX job to the MFP 4 through the network 3. The MFP 4 receives this FAX job and transmits a facsimile to the destination being set.

Figure 2A:
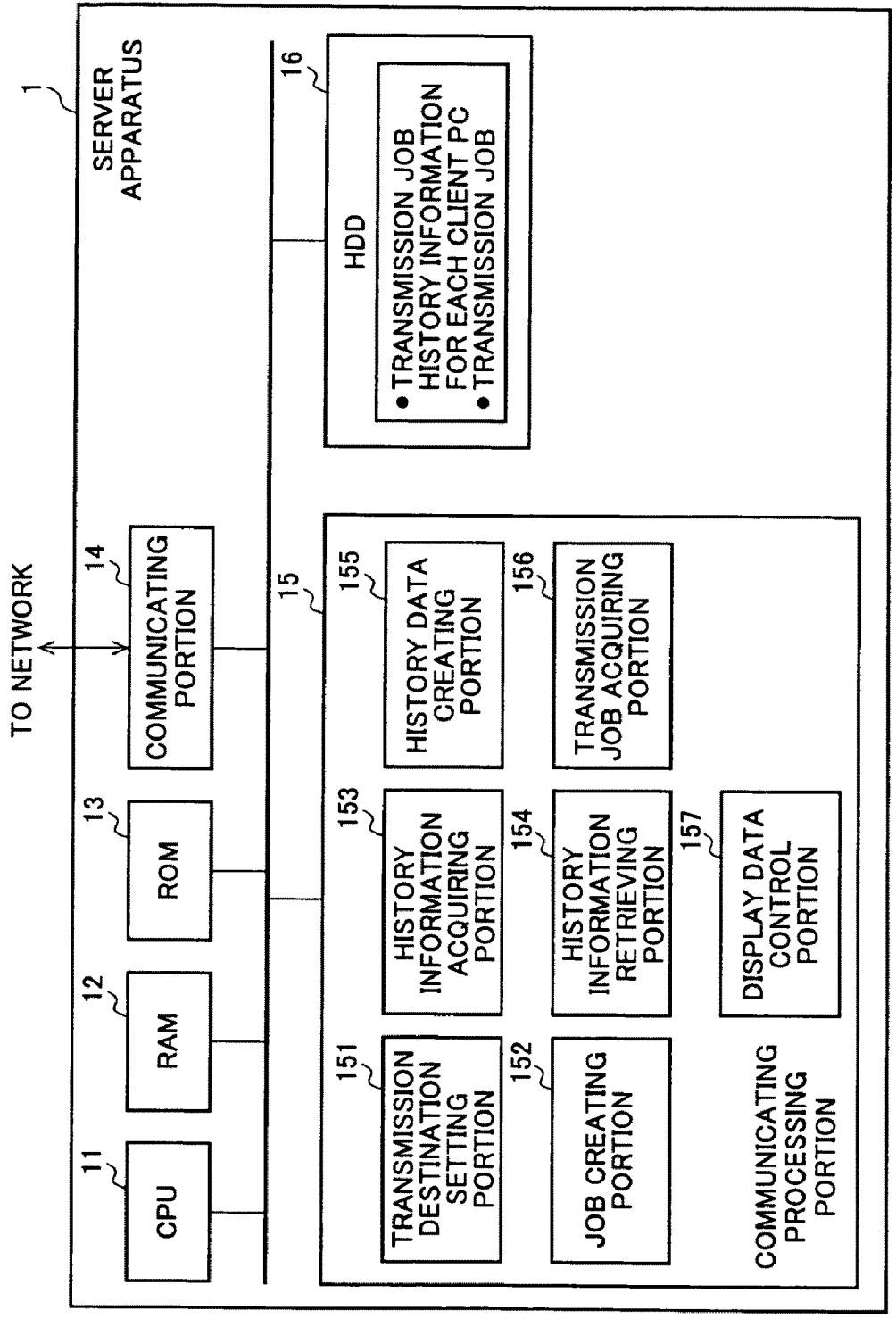
FIGS. 2A and 2B are block diagrams of exemplary configurations of the essential parts of a server apparatus and a client PC in the information processing system shown in FIG. 1.
Figure 2B:
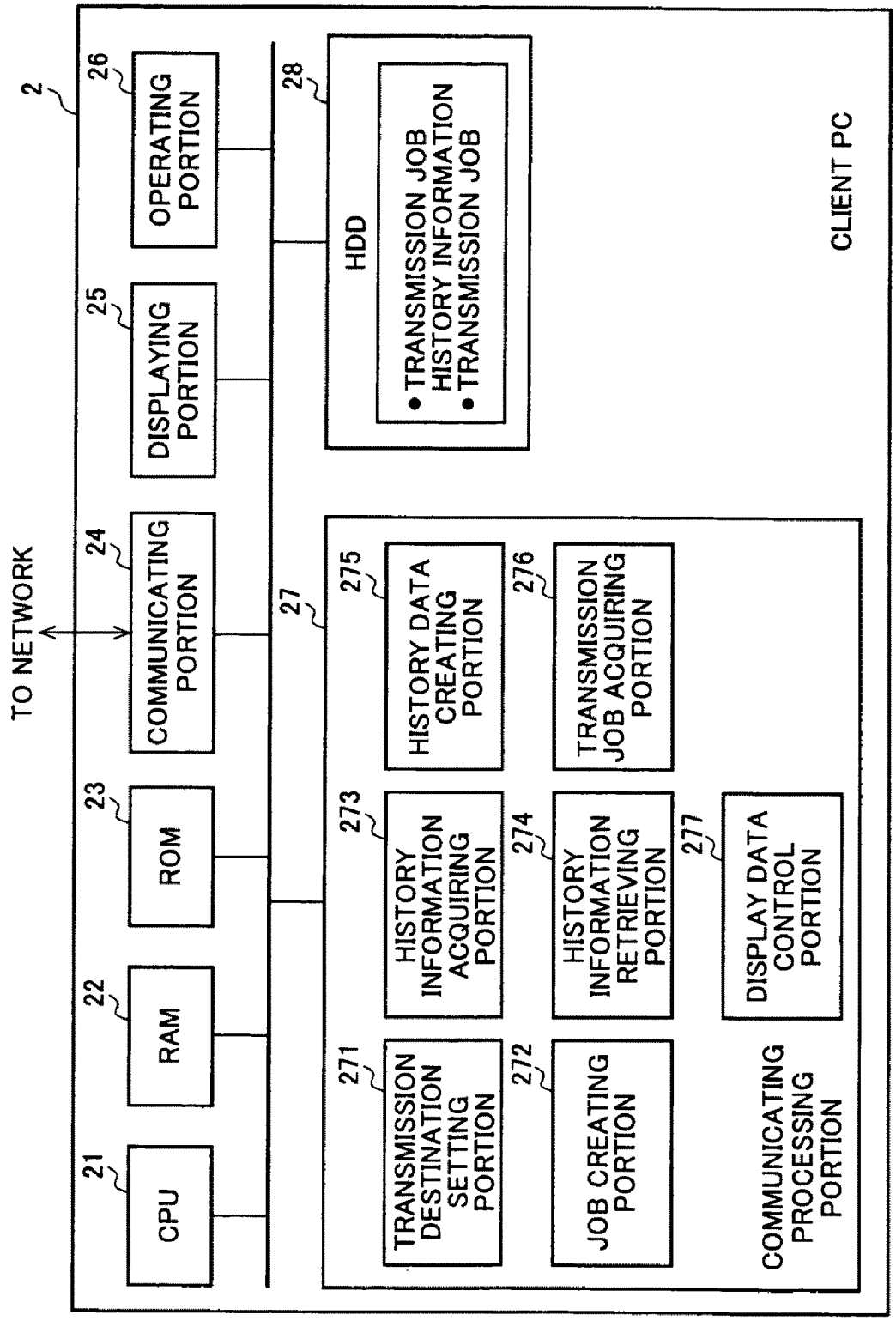

FIGS. 2A and 2B are block diagrams of exemplary configurations of the essential parts of a server apparatus 1 and a client PC 2 in the information processing system shown in FIG. 1. FIG. 2A depicts an exemplary configuration of the server apparatus 1. FIG. 2B depicts an exemplary configuration of the client PC 2.

In FIG. 2A, the server apparatus 1 includes: a CPU 11 that controls the functions of the server apparatus 1 and executes various types of operations; a RAM 12 for temporarily storing and developing a program to be executed by the CPU 11; a ROM 13 that stores a control program such as BIOS to be executed by the CPU 11; a communicating portion 14 that performs data communication through the network 3, receives data created by an application of the plurality of client PCs 2, transmits the received data to the MFP 4, and receives the state of the MFEP 4; a communication processing portion 15 that executes FAX communication, etc., using the MFP 4; and an HDD 16 that is a hard disc drive for storing various types of driver softwares, application programs, various types of data, and the like, and also storing, for each client PC, history information of transmission jobs transmitted to the MFP 4 and the transmission jobs.

In the embodiment, the communication processing portion 15 comprises programs such as a FAX driver or a FAX application to execute FAX communication using the MFP 4, and an electronic mail application to execute transmission and reception of electronic mails using the MFP 4. The programs are stored in the HDD 16 and are read and executed by the CPU 11.

When FAX communication is executed by the communication processing portion 15, the communication processing portion 15 includes: a transmission destination setting portion 151 that sets a transmission destination of a FAX job; a job creating portion 152 that creates a transmission job of a facsimile based on image data from the client PC 2; a history information acquiring portion 153 that acquires transmission job history information from the HDD 16; a history information retrieving portion 154 that retrieves transmission job history information that agrees to a predetermined retrieval condition (such as the time and date of transmission) from the transmission job history information acquired by the history information acquiring portion 153; a history data creating portion 155 that creates history data such as thumbnail images and a history list, from the transmission job history information acquired by the history information acquiring portion 153; a transmission job acquiring portion 156 that acquires transmission jobs from the HDD 16; and a display data control portion 157 that creates display data that can be displayed on a displaying portion of the client PC 2 based on the history data created by the history data creating portion 155 and causes the displaying portion of the client PC 2 to display the display data.

In FIG. 2B, the client PC 2 includes: a CPU 21 that controls the functions of the client PC 2 and executes various types of operations; a RAM 22 for temporarily storing and developing a program to be executed by the CPU 21; a ROM 23 that stores a control program such as BIOS to be executed by the CPU 21; a communicating portion 24 that executes data communication through the network 3 and transmits the data created by an application to the MFP 4; a displaying portion 25 that comprises an LCD (Liquid Crystal Display), a CRT (Cathode Ray Tube) or the like; an operating portion 26 that comprises an input device such as a keyboard, a mouse; a communication processing portion 27 to execute FAX communication, etc., using the MFP 4; and an HDD 28 that is a hard disc drive for storing various types of driver softwares, application programs, various types of data, etc., and also storing the history information of transmission jobs transmitted to the MFP 4 and the transmission jobs.

Similarly to the case of FIG. 2A, the communication processing portion 27 comprises programs such as a FAX driver or a FAX application to execute FAX communication using the MFP 4. The programs are stored in the HDD 28 and are read and executed by the CPU 21. The communication processing portion 27 includes: a transmission destination setting portion 271 that sets a transmission destination of a FAX job; a job creating portion 272 that creates a transmission job of a facsimile based on image data created by an application; a history information acquiring portion 273 that acquires transmission job history information from the HDD 28; a history information retrieving portion 274 that retrieves transmission job history information that agrees to a predetermined retrieval condition (such as the date and the time of transmission) from the transmission job history information acquired by the history information acquiring portion 273; a history data creating portion 275 that creates history data such as thumbnail images, a history list, etc., from the transmission job history information acquired by the history information acquiring portion 273; a transmission job acquiring portion 276 that acquires transmission jobs from the HDD 28; and a display data control portion 277 that causes the displaying portion 25 to display the history data created by the history data creating portion 275.

The transmission job history information stored in the HDD 16 of the server apparatus 1 and the HDD 28 of the client PC 2 corresponds to the transmission history of the present invention and the information includes, for example, the time and date of transmission, the job name, the destination address information (such as the FAX number), the transmission result (success or failure of transmission), transmission image data, etc.

Figure 3:
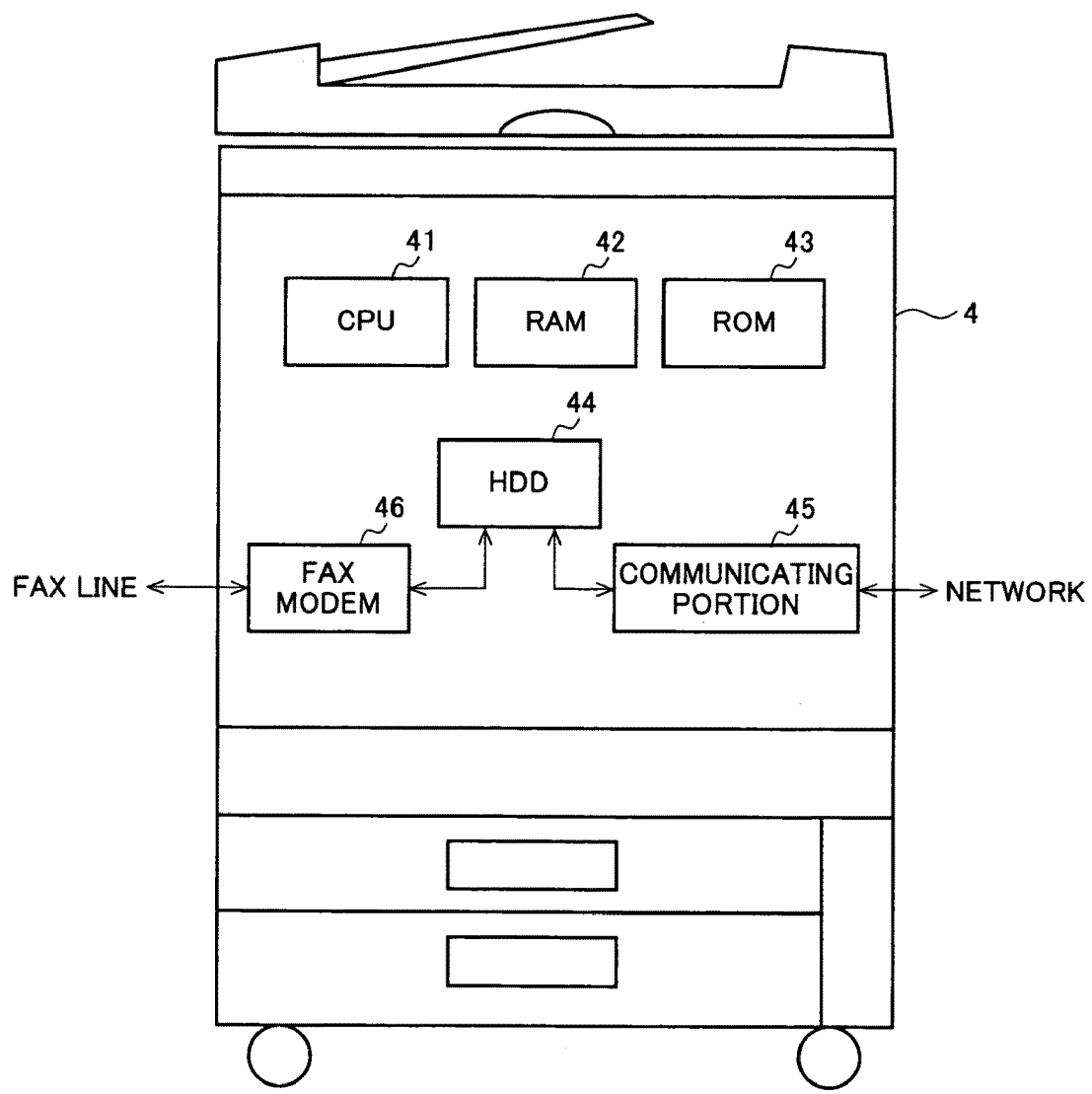
FIG. 3 is a block diagram of an exemplary configuration of the essential parts of an MFP in the information processing system shown in FIG. 1.

FIG. 3 is a block diagram of an exemplary configuration of the essential parts of the MFP 4 in the information processing system shown in FIG. 1. In FIG. 3, the MFP 4 includes: a CPU 41 that controls the functions of the MFP 4 and executes various types of operations; a RAM 42 for temporarily storing and developing a program to be executed by the CPU 41; a ROM 43 that stores a control program such as BIOS, etc., to be executed by the CPU 41; an HDD 44 that is a hard disc drive that holds and stores a FAX job received from the server apparatus 1 or the client PC 2; a communicating portion 45 that executes data communication through the network and receives a FAX job received from the server apparatus or the client PC 2; and a FAX modem 46 that transmits the FAX job received by the communicating portion 45 to a FAX line. In the information processing system shown in FIG. 1, when the client PC 2 includes the communication processing portion 27, the server apparatus 1 may be omitted and, when the server apparatus 1 includes the communication processing portion 15, the communication processing portion 27 of the client PC 2 may be omitted.

Description will be made below, as a representative example, on the case where the client PC 2 is applied to the information processing apparatus according to the present invention. However, as described above, the client PC 2 is also applicable to the server apparatus 1.

The main characteristic portion of the present invention is that, in the information processing system, when a transmission history such as a FAX job is displayed, an image included in the transmission history is displayed as a thumbnail or the transmission history in a history list is displayed by classifying it according to a specific condition such as the transmission result. For this configuration, the client PC 2 includes: the HDD 28 that corresponds to the transmission history storing portion that stores, for each transmission job, a transmission history including the image data that is instructed the MFP 4 to transmit; the history data creating portion 275 that creates a thumbnail image by converting the image data of the stored transmission history into a thumbnail; and a display data control portion 277 that causes the displaying portion 25 to display the thumbnail image created by the history data creating portion 275.

The history data creating portion 275 may create a history list of the information concerning the transmission history stored in the HDD 28. In this case, when the display data control portion 277 causes the history list created by the history data creating portion 275 to be displayed, the portion 277 causes the transmission history of the history list to be displayed by classifying it according to the state of the transmission result (success or failure of the transmission).

Figure 4:
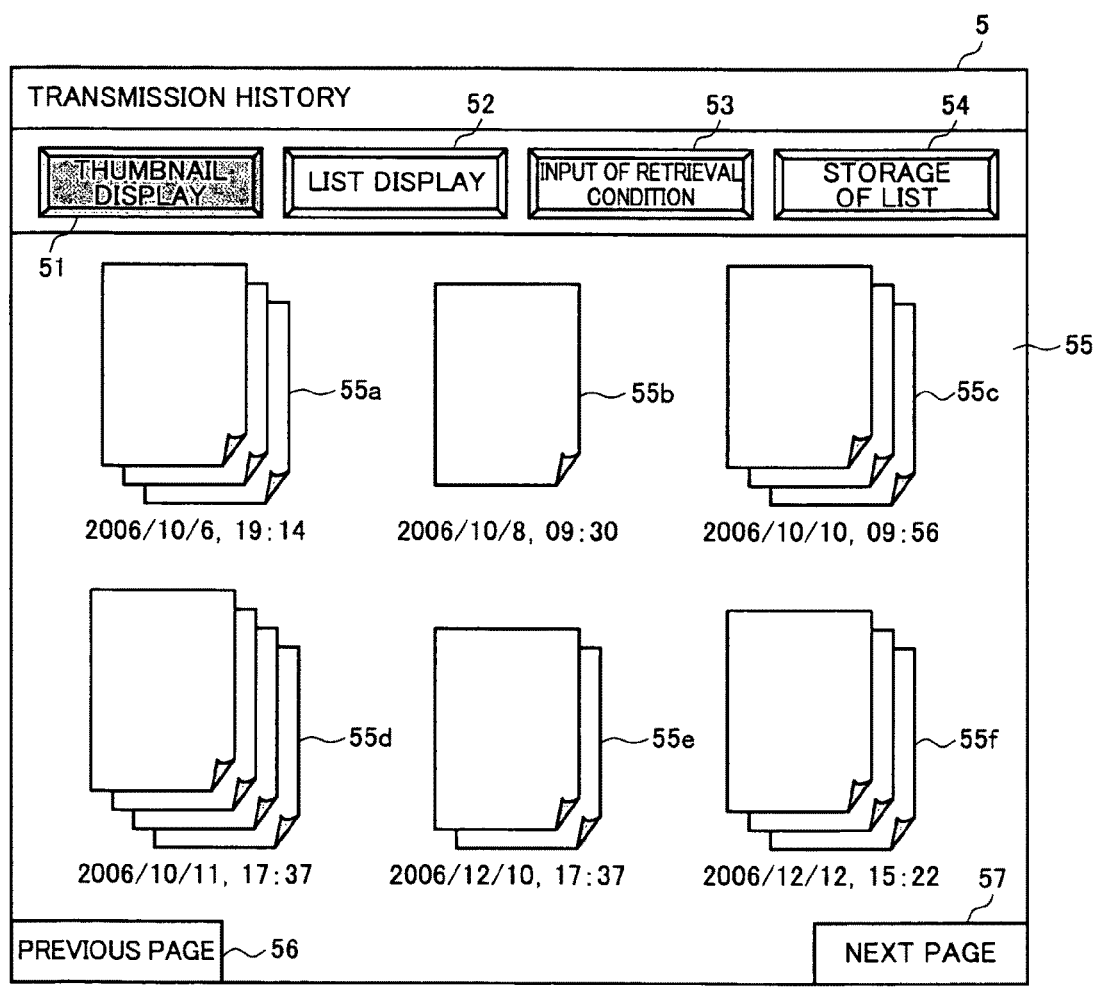
FIG. 4 depicts an exemplary screen displayed when thumbnail images of a transmission history are displayed on a client PC.

FIG. 4 depicts an exemplary screen displayed when thumbnail images of a transmission history are displayed on a client PC 2. In FIG. 4, "5" denotes a transmission history screen. The transmission history screen 5 is displayed on the displaying portion 25 when a user operates the operating portion 26 to execute a FAX application and selects "transmission history display" on a menu of the FAX application. The history data creating portion 275 creates the transmission history screen 5 and the display data control portion 277 causes the screen 5 to be displayed on the displaying portion 25. The transmission history screen 5 includes a thumbnail display button 51, a list display button 52, and a retrieval condition input button 53 as selectable items.

The example in FIG. 4 shows the display state when the user pushed the thumbnail display button 51 displayed on the operating portion 26. A thumbnail image display area 55 displays thumbnail images 55a to 55f which are thumbnails of the image data of a transmission history for each transmission job. When a transmission history extends over pages, a user can view thumbnail images on a previous page by clicking the previous page 56 using a mouse, etc., and the user can view thumbnail images on the next page by clicking the next page 57. By displaying the transmission history as thumbnails, the transmitted content can be easily and quickly found and checked.

The display data control portion 277, when it causes the thumbnail images created by the history data creating portion 275 to be displayed, is able to cause transmission history information including any one or more of the time and date of transmission, the job name, the destination information (such as the FAX number), and the transmission result of the image data that correspond to the thumbnail images, to be simultaneously displayed. In the example in FIG. 4, the time and date of transmission and thumbnail images are displayed together. By displaying the transmission history information together with the thumbnail images, the transmitted content can be more quickly found and checked.

In the case where the thumbnail images created by the history data creating portion 275 are displayed, when the first piece of the image data that corresponds to a thumbnail image is a cover letter, the display data control portion 277 is able to cause the thumbnail images of the second piece and the following pieces of the image data to be displayed. In many cases, the first piece of a FAX is a typical cover letter and, even when this cover letter is converted into a thumbnail image, it is difficult for a user to grasp its content. Therefore, when the image data of the second piece and the following pieces is converted into thumbnail images, it is easier for the user to grasp the content and the work efficiency is improved.

Whether image data is indicative of a cover letter can be determined by, for example, extracting a characteristic amount such as the specific character information or the specific layout that the cover letter has. Alternatively, the cover letter can be determined by extracting the identification information indicating the cover letter that is added to it in advance.

Figure 5:
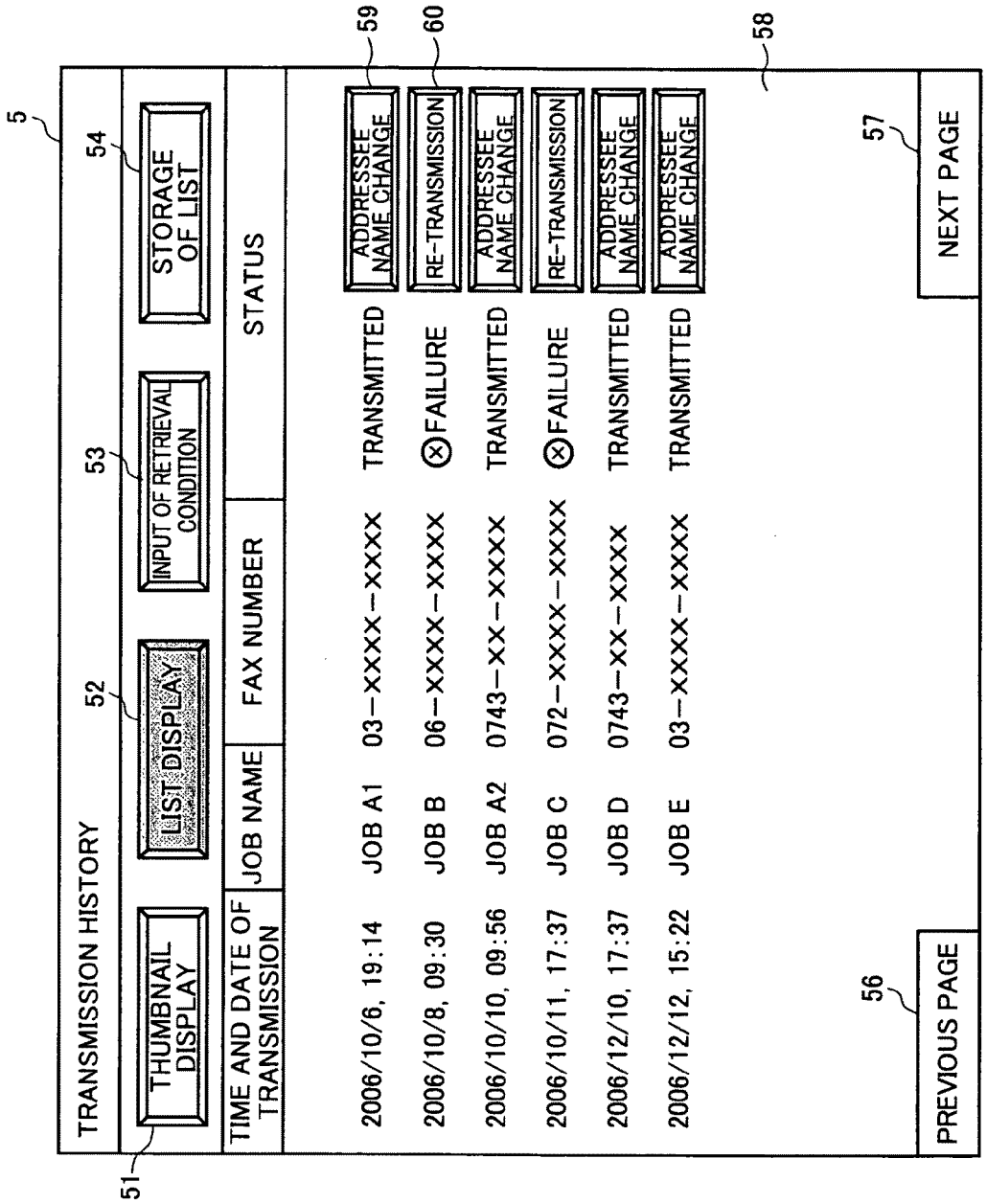
FIG. 5 depicts an exemplary screen displayed when a history list of transmission histories is displayed on the client PC.

FIG. 5 depicts an exemplary screen displayed when a history list of transmission histories is displayed on the client PC 2. The transmission history screen 5 of the example shows the display state when the user pushed the list display button 52 displayed on the operating portion 26. In a history list display area 58, pieces of transmission history information such as the time and date of transmission are sequentially displayed for each transmission job. Similarly to the example in FIG. 4, the transmission history screen 5 of this example is created by the history data creating portion 275 and the display data control portion 277 causes the screen 5 to be displayed on the displaying portion 25.

Six pieces of transmission history information displayed in the history list display area 58 correspond to, sequentially from above, the thumbnail images 55a (job A1), 55b (job B), 55c (job A2), 55d (job C), 55e (job D), and 55f (job E) shown in the above FIG. 4. The transmission history information has transmission history items of "the time and date of transmission", "job name", "FAX number", and "status". "Status" is indicative of whether the MFP 4 succeeds or fails in transmitting the image data. An addressee name change button 59 and a re-transmission button 60 are selectively added to "Status", which correspond to a transmission destination change key to change the transmission destination of the image data that the MFP 4 succeeded to transmit to another transmission destination, and to a re-transmission key to re-transmit the image data that the MFP 4 failed to transmit, respectively.

Using the above "status", the user can grasp, for each transmission history, that the transmission is successful when the "status" is indicative of "transmitted" and that the transmission is failed when the "status" is indicative of "failure" and, thereby, the user can easily recognize the transmission result of a FAX. Only by viewing this history list, the user can extract a transmission history in the same status and can check the content of the transmission history.

FIG. 6 depicts an example of a retrieval condition input screen displayed on the client PC 2.

In the transmission history screen 5 shown in FIG. 5, when a user pushes the retrieval condition input button 53 displayed on the operating portion 26, a retrieval condition input screen shown in FIG. 6 is displayed on the displaying portion 25. The user can input at least one of the time and date of transmission, the job name, the destination information (such as the FAX number), and the transmission result (success or failure of the transmission) as a retrieval condition. Based on the retrieval condition(s), a transmission history of the history list is retrieved and the retrieval result is displayed on the displaying portion 25. The retrieval processing in this case is executed by the history information retrieving portion 274.

FIG. 7 depicts an example of a list storage screen displayed on the client PC 2.

In the transmission history screen 5 shown in FIG. 5, when a user pushes a storage button 54 displayed on the operating portion 26, a list storage screen shown in FIG. 7 is displayed on the displaying portion 25. Using this list storage screen, the user can give a file name to and store the history list displayed on the transmission history screen 5.

Description will be made of a re-transmission processing of a transmitted job that the MFP 4 fails to transmit, referring to the transmission history information displayed in the transmission history screen 5.

FIG. 8 depicts an example of a re-transmission instruction screen displayed on the client PC 2.

In the transmission history screen 5 shown in FIG. 5, when a user pushes the re-transmission button 60 displayed on the operating portion 26 that is located beside the transmission history whose "status" is "failure", the re-transmission instruction screen shown in FIG. 8 is displayed on the displaying portion 25. When, for this re-transmission instruction screen, the user pushes a "YES" button displayed on the operating portion 26, the transmission job acquiring portion 276 acquires a corresponding transmission job stored in the HDD 28. For this transmission job, the job creating portion 272 creates a transmission job whose time and date of the transmission in its header portion are changed and the communicating portion 24 transmits this transmission job to the communicating portion 45 of the MFP 4 through the network 3.

When the transmission job is in the FAX form, the MFP 4 transmits the transmission job received from the client PC 2 from the FAX modem 46 to a FAX line. When the transmission job is in the electronic mail form, the MFP 4 transmits the transmission job received from the client PC 2 from the communicating portion 45 to a network.

As above, for a transmission job that the MFP fails to transmit, re-transmitting can easily be executed in one-step operation from a history list.

Referring to the transmission history information displayed in the transmission history screen 5, description will be made of a transmission process of a transmission job formed by changing the addressee of a transmitted job that the MFP 4 succeeded to transmit.

Figure 9:
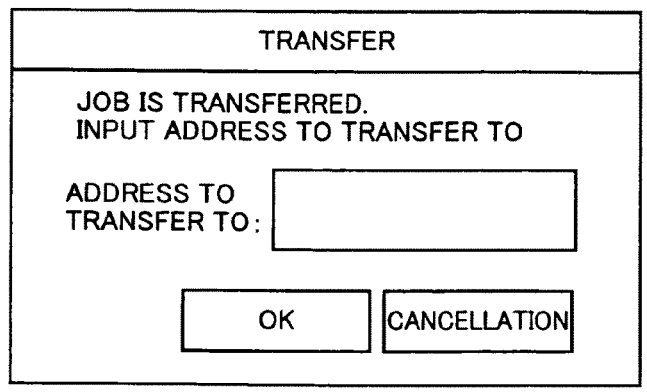
FIG. 9 depicts an example of a transfer instruction screen displayed on the client PC.

FIG. 9 depicts an example of a transfer instruction screen displayed on the client PC 2.

In the transmission history screen 5 shown in FIG. 5, when a user selects an addressee change button 59 displayed on the operating portion 26 that is located beside the history whose "status" is "transmitted", the transfer instruction screen shown in FIG. 9 is displayed on the displaying portion 25. The user operates the operating portion 26 and inputs an address to be transferred to. Thereafter, when the user pushes an "OK" button, the transmission job acquiring portion 276 acquires a corresponding transmission job stored in the HDD 28. The transmission destination setting portion 271 sets the transmission destination for this transmission job and, thereafter, the job creating portion 272 creates a transmission job whose time and date of transmission in its header portion are changed. The communicating portion 24 transmits this transmission job to the communicating portion 45 of the MFP 4 through the network 3.

When the transmission job is in the FAX form, the MFP 4 transmits the transmission job received from the client PC 2, from the FAX modem 46 to the FAX line. When the transmission job is in the electronic mail form, the MFP 4 transmits the transmission job received from the client PC 2 from the communicating portion 45 to a network.

As above, for a transmission job that the MFP succeeded to transmit, another transmission job that has the same content can be easily transmitted by changing only its address.

Figure 10:
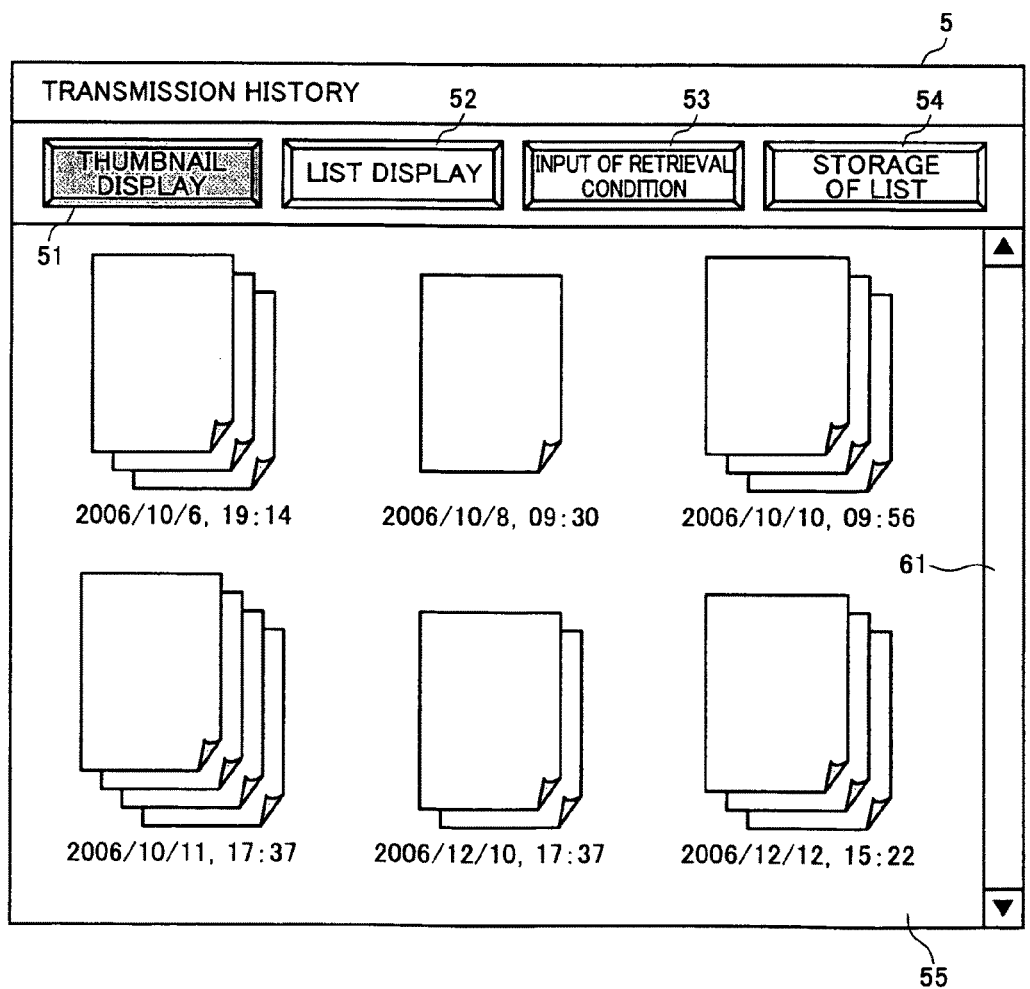
FIG. 10 depicts another exemplary screen displayed when thumbnail images of the transmission history are displayed on the client PC.

FIG. 10 depicts another exemplary screen displayed when thumbnail images of a transmission history are displayed on the client PC 2. The transmission history screen 5 in this example shows an exemplary screen that scrollably displays the thumbnail images when the thumbnail images created by the history data creating portion 275 can not be displayed in one screen and the screen 5 displays a scroll bar 61 concurrently with the thumbnail images. This screen is created by the history data creating portion 275 and the display data control portion 277 causes this screen to be displayed on the displaying portion 25. As above, by displaying thumbnail images that can not be displayed in one screen using a scroll bar, a user can efficiently check images of all transmission histories.

Figure 11:
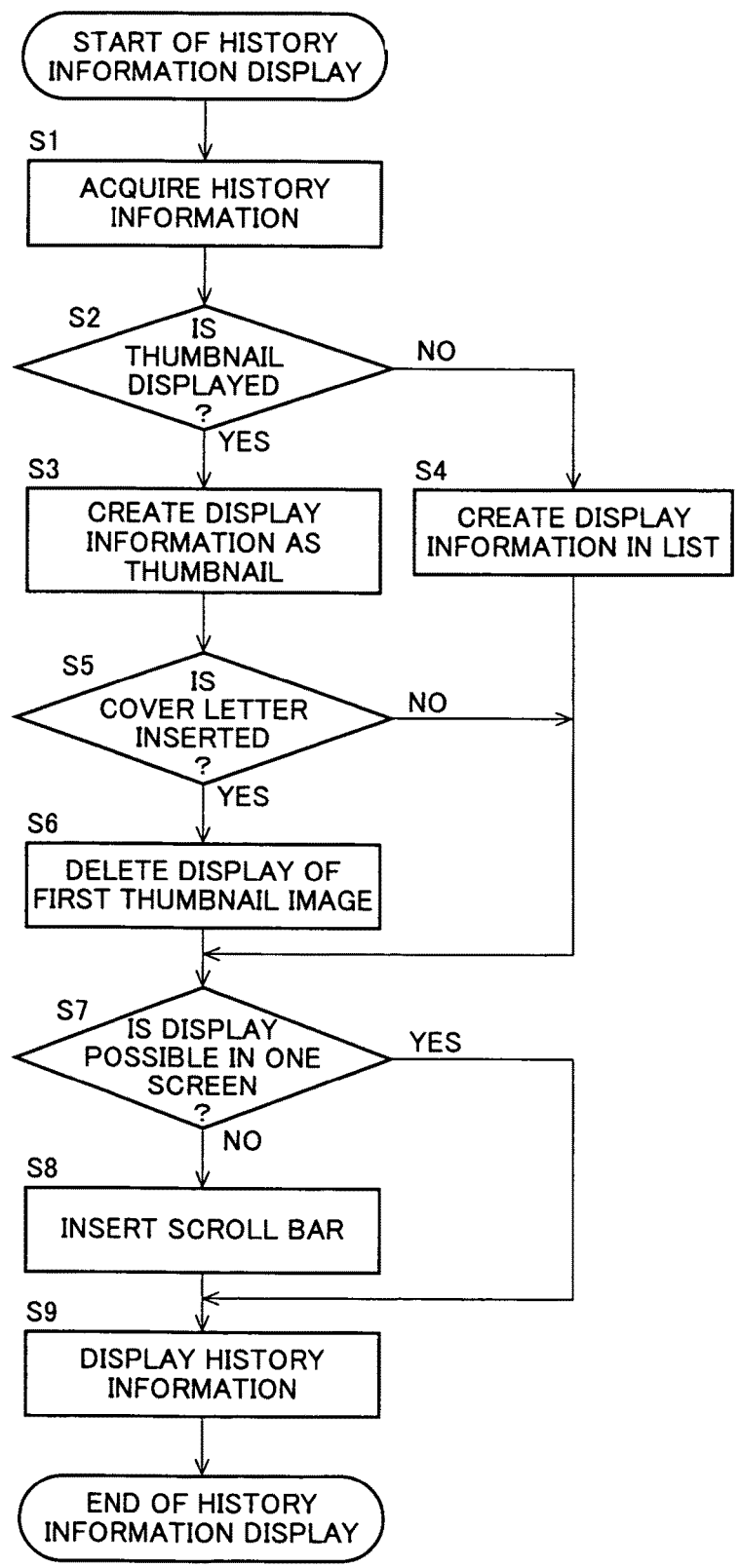
FIG. 11 is an explanatory flowchart of an example of a history information displaying method according to the information processing system shown in FIG. 1.

FIG. 11 is an explanatory flowchart of an example of a history information displaying method according to the information processing system shown in FIG. 1. When a user operation instructs to select "transmission history display" of a FAX application, the client PC 2 acquires transmission history information stored in the HDD 28 using the history information acquiring portion 278 (step S1), and the client PC 2 determines whether the acquired transmission history information is displayed as thumbnail images or as a history list (step S2). This determining processing determines to display as the thumbnail images when the thumbnail display button 51 is selected in the transmission history screen 5 shown in the above FIG. 4, and determines to display as the history list when the list display button 52 is selected.

The client PC 2, when it determines to display the information as thumbnail images (the case of YES) at step S2, creates display information as the thumbnails from the transmission history information using the history data creating portion 275 (step S3). On the other hand, at step S2, when it is determined that the information is displayed as a list (the case of NO), the history data creating portion 275 creates the display information as the history list from the transmission history information (step S4) and the process is shifted to step S7.

The client PC 2 determines whether a cover letter is inserted in the first piece of the thumbnail images (step S5). When the cover letter is inserted (the case of YES), the history data creating portion 275 deletes the first thumbnail image (step S6). On the other hand, at step S5, no cover letter is inserted (the case of NO), the process is shifted to step S7.

The client PC 2 determines whether the thumbnail images can be displayed on one screen (step S7). When the thumbnail images can not be displayed on one screen (the case of NO), the history data creating portion 275 inserts a scroll bar into the display information of the thumbnail images (step S8). On the other hand, at step S7, when the thumbnail images are able to be displayed on one screen (the case of YES), the process is shifted to step S9.

The client PC 2 displays the display information of the thumbnail images or the history list created by the history data creating portion 275 on the displaying portion 25 using the display data control portion 277 (step S9). A display screen of the thumbnail images at step S9 can be, for example, the one shown in the above FIG. 4 or 10. The display screen of the history list can be, for example, the one shown in the above FIG. 5.

Referring to the above FIG. 11, description will be made of the case where a processing for displaying the transmission history is executed from the client PC 2 through the server apparatus 1. The basic flow of the process is similar to that of the above case of the client PC 2. When a user operation instructs to select "transmission history display" of the FAX application, the server apparatus 1 acquires the transmission history information stored in the HDD 16 using the history information acquiring portion 153 (step S1) and the server apparatus 1 determines whether the acquired transmission history information is displayed as thumbnail images or as a history list (step S2). This determining processing is the same as that of the above one and the description therefor is omitted.

At step S2, when it is determined that the thumbnail images are displayed (the case of YES), the server apparatus 1 creates display information as thumbnails from the transmission history information using the history data creating portion 155 (step S3). On the other hand, at step S2, when it is determined that the list is displayed (the case of NO), the server apparatus 1 creates display information as a history list from the transmission history information using the history data creating portion 155 (step S4) and the method moves to step S7.

The server apparatus 1 determines whether a cover letter is inserted in the first piece of the thumbnail images (step S5). When the cover letter is inserted (the case of YES), the history data creating portion 155 deletes the first thumbnail image (step S6). On the other hand, at step S5, no cover letter is inserted (the case of NO), the process is shifted to step S7.

The server apparatus 1 determines whether the thumbnail images are able to be displayed on one screen (step S7). When the thumbnail images can not be displayed on one screen (the case of NO), the history data creating portion 155 inserts a scroll bar into the display information of the thumbnail images (step S8). On the other hand, at step S7, when the thumbnail images are able to be displayed on one screen (the case of YES), the process is shifted to step S9.

The server apparatus 1 displays the display information of the thumbnail images or the history list created by the history data creating portion 155 on the displaying portion 25 of the client PC 2 (step S9). A display screen of the thumbnail images at step S9 can be, for example, the one shown in the above FIG. 4 or 10. The display screen of the history list can be, for example, the one shown in the above FIG. 5.

When the communication environment is configured utilizing the server apparatus 1, in response to a request to display the transmission history from any one client PC of the plurality of client PCs 2, the display data control portion 157 is able to cause the displaying portion of the client PC that issued the display request to display the thumbnail images or the history list created by the history data creating portion 155.

By utilizing the server apparatus 1, transmission histories from the plurality of client PCs 2 can be managed uniformly. For example, when the server apparatus 1 has stored therein transmission histories of the client PCs 2a, 2b, and 2c, the server apparatus 1 may cause the client PC 2a to display all of the transmission histories of the client PCs 2a to 2c, in response to a request to display the transmission history from the client PC 2a. In this case, a user of the client PC 2a is also able to check the transmission histories of the other client PCs 2b and 2c, and the user is also able to execute processing such as re-transmission of FAXes of the other client PCs 2b and 2c that are not transmitted.

Figure 12A:
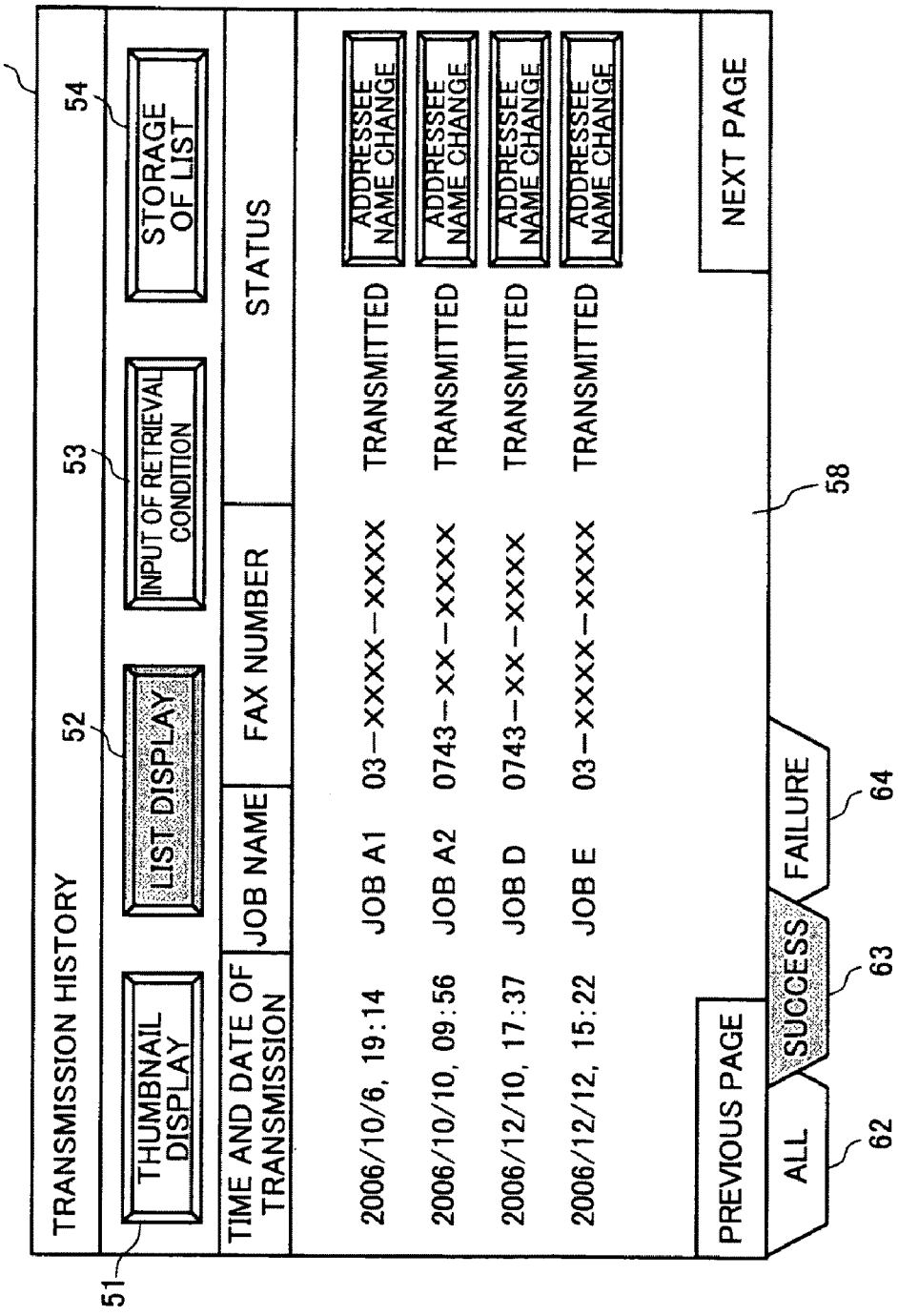

FIGS. 12A and 12B respectively depict other exemplary screens displayed when a history list of transmission histories is displayed on the client PC 2. In this case, an example is shown which the transmission histories of the history list shown in the above FIG. 5 are displayed by classifying them using tabs for each state of the transmission result of the transmission history. In FIGS. 12A and 12B, "62" is a tab to display a list of all transmission histories, "63" is a tab to display transmission history whose transmission of image data is succeeded, and "64" is a tab to display transmission history whose transmission of image data is failed.

The transmission history screen 5 of the example shows the display state displayed when a user operates the operating portion 26 and the list display button 52 is selected. In the case of an example shown in FIG. 12A, a list of transmission histories grouped by a tab 63 that is indicative of a success of the transmission is displayed in the history list display area 58. In the case of an example shown in FIG. 12B, a list of transmission histories grouped by a tab 64 that is indicative of a failure of the transmission is displayed in the history list display area 58. Similarly to the example of FIG. 5, the transmission history screen 5 of the example is also created by the history data creating portion 275 and the display data control portion 277 causes the displaying portion 25 to display thereon the screen 5. As above, by displaying the transmission histories grouped by a tab, whether FAX transmission is succeeded or failed can be recognized at a glance and pieces of image data that are in the same state can efficiently be found.

A variation of the above may display the transmission histories of the history list shown in the above FIG. 5 by coloring differently according to the state of the transmission results of the transmission histories. That is, the transmission histories whose transmission is succeeded and the transmission histories whose transmission is failed are colored differently such that the user can distinguish one from the other. In this case, the characters themselves of each of the transmission histories may be expressed in different colors or the background of each of the transmission histories may be expressed in a different color.

Figure 13:
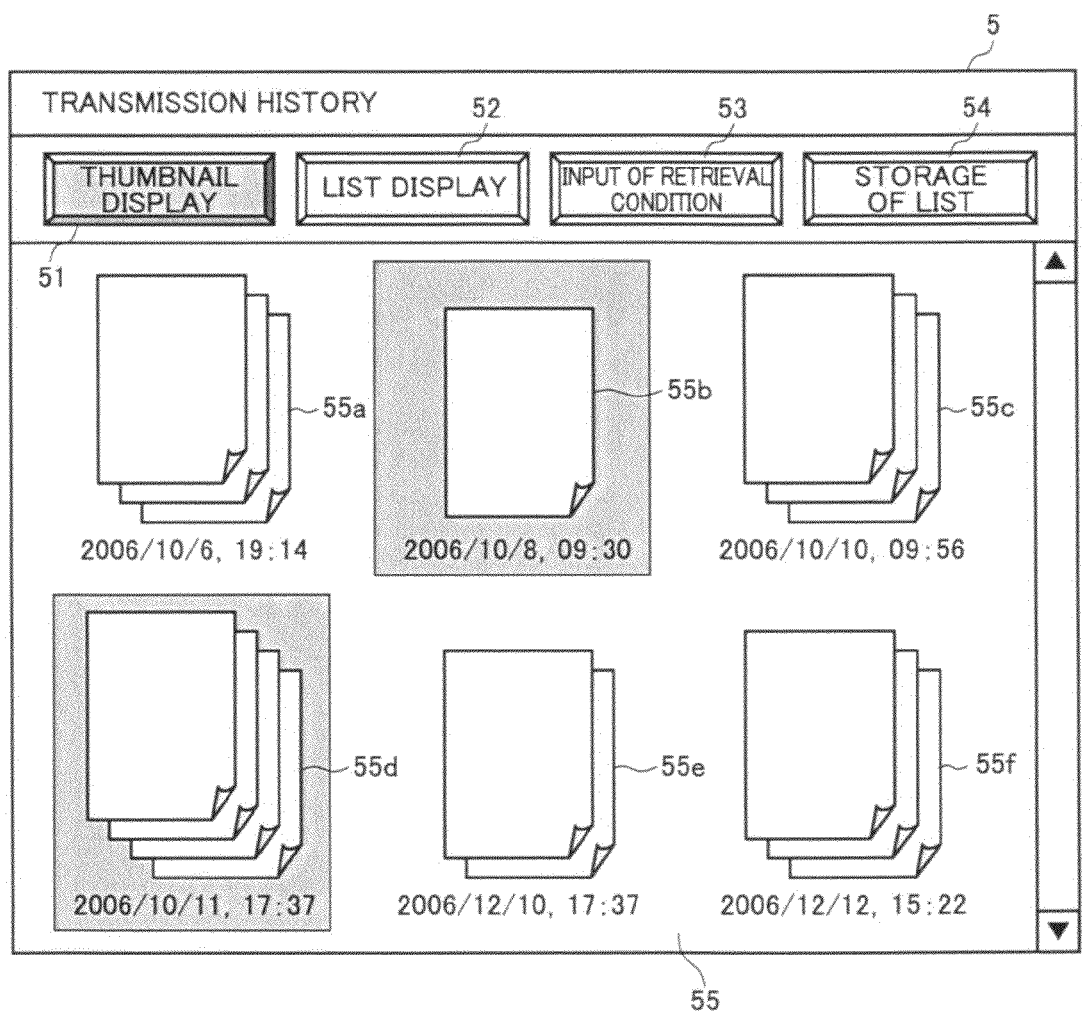
FIG. 13 depicts another exemplary screen displayed when the thumbnail images of the transmission history are displayed on the client PC.

FIG. 13 depicts another exemplary screen displayed when the thumbnail images of the transmission histories are displayed on the client PC 2. In this case, an example is shown when the thumbnails are classified by color according to the state of the transmission results that correspond to the thumbnail images shown in the above FIG. 10. The thumbnail images 55b and 55d of the thumbnail images 55a to 55f in the example are image data whose transmission is failed. Therefore, the thumbnail images 55b and 55d are displayed by coloring differently to make them distinguishable from the other thumbnail images whose transmission is succeeded. By displaying the transmission histories by coloring differently in this manner, whether the FAX transmission is succeeded or failed can be recognized at a glance and pieces of image data that are in the same state can efficiently be found.

Figure 14:
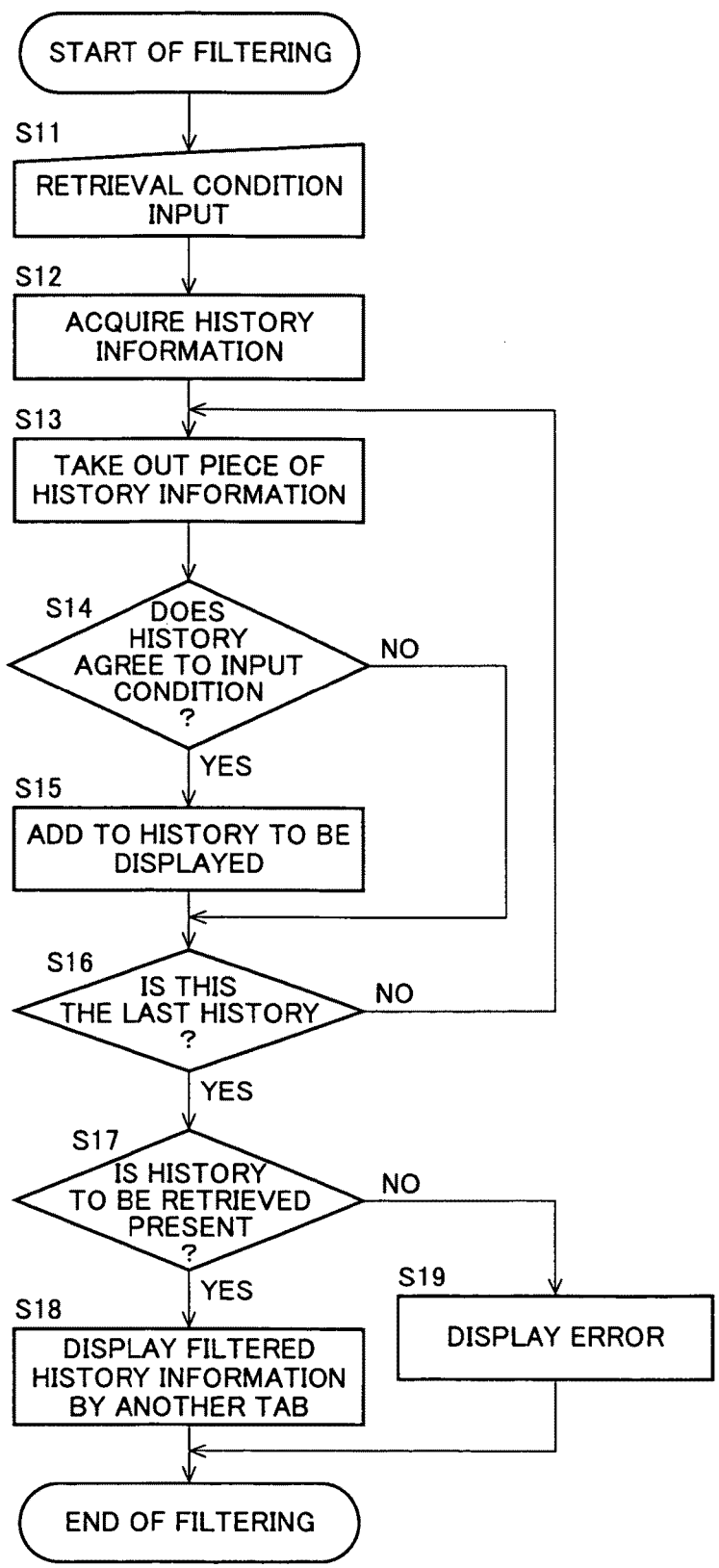
FIG. 14 is an explanatory flowchart of an example of a transmission history retrieving method according to the information processing system shown in FIG. 1.

FIG. 14 is an explanatory flowchart of an example of a transmission history retrieving method using the information processing system shown in FIG. 1. In the transmission history screen 5 shown in the above FIG. 5, when a user pushes the input 53 displayed on the operating portion 26, the client PC 2 displays the retrieval condition input screen shown in FIG. 6 on the displaying portion 25. The user operates the operating portion 26 and inputs a keyword that the user desires to retrieve into the retrieval condition input screen (step S11). For example, the time and date of transmission, the job name, the destination information, the transmission result, etc., may be input as the retrieval condition.

The client PC 2 acquires the transmission history information stored in the HDD 28 using the history information acquiring portion 273 (step S12), takes out a transmission history sequentially one after another from the acquired transmission history information (step S13), and determines whether each of the transmission histories taken out corresponds to the keyword input at step S11 (step S14). The history information retrieving portion 274 executes this determining processing.

When the client PC 2 determines that the transmission history corresponds to the keyword at step S14 (the case of YES), the client PC 2 transmits the transmission history to the history data creating portion 275 as the history to be displayed (step S15). When the client PC 2 determines that the transmission history does not correspond to the keyword at step S14 (the case of NO), the process is shifted to step S16.

At step S16, the client PC 2 determines whether or not the transmission history is the last transmission history. When the client PC 2 determines that the transmission history is not the last transmission history (the case of NO), the process is returned to step S13 and processing is repeated until no transmission history is present. When the client PC 2 determines at step S16 that the transmission history is the last transmission history (the case of YES), the client PC 2 determines whether there is any transmission history sent to the history data creating portion 275 (step S17).

When the client PC 2 determines at step S17 that there is a transmission history sent to the history data creating portion 275 (the case of YES), the client PC 2 creates history data that is added with a new tab for the transmission history using the history data creating portion 275, and displays the history data on the displaying portion 25 using the display data control portion 277 as shown in the FIG. 15 that is described later (step S18). On the other hand, when the client PC 2 determines at step S17 that there is no transmission history sent to the history data creating portion 275 (the case of NO), the client PC 2 displays an error message on the displaying portion 25 using the display data control portion 277 as shown in FIG. 16 that is described later (step S19).

Figure 15:
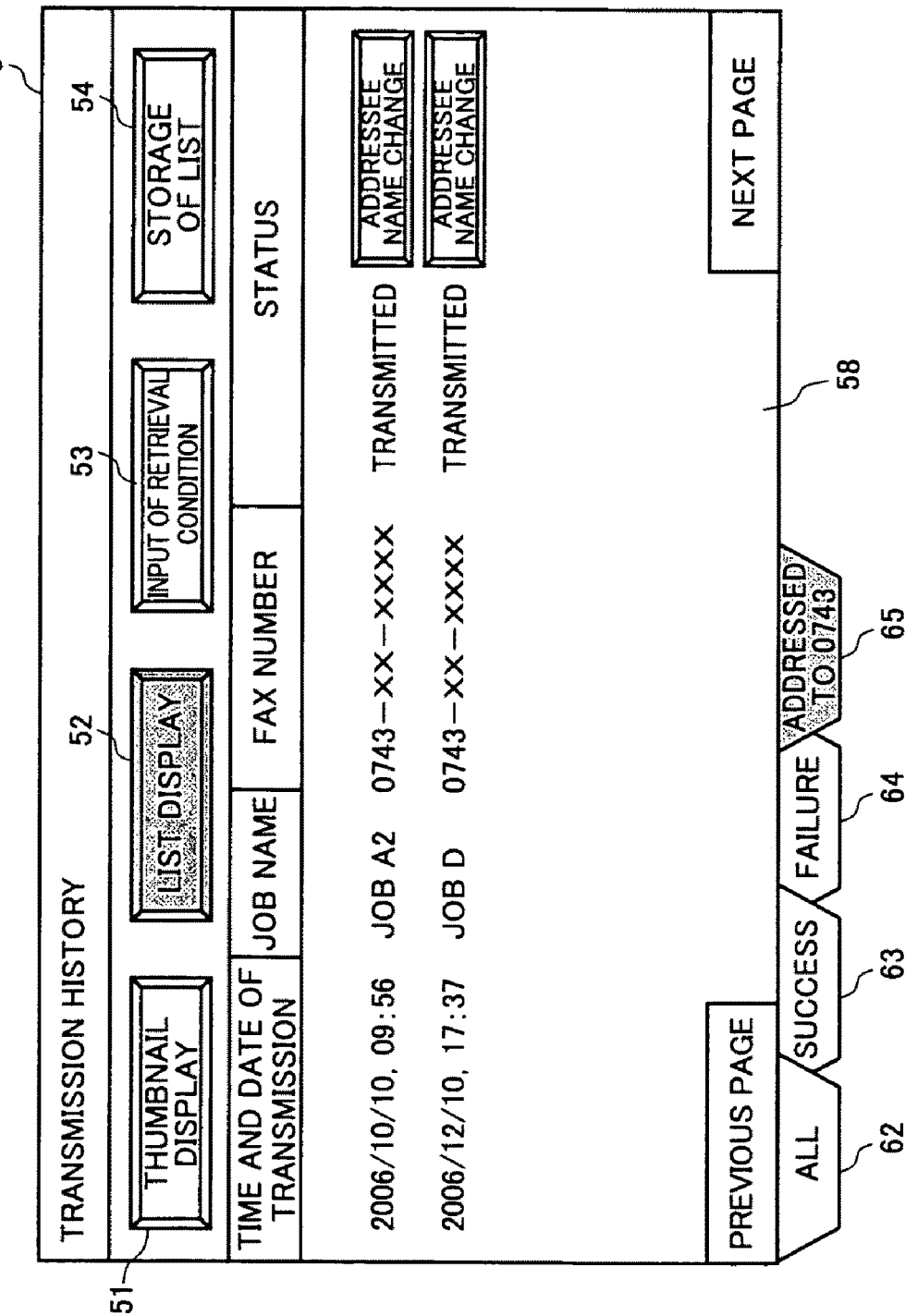
FIG. 15 depicts another exemplary screen displayed when a history list of transmission histories is displayed on the client PC.
Figure 16:
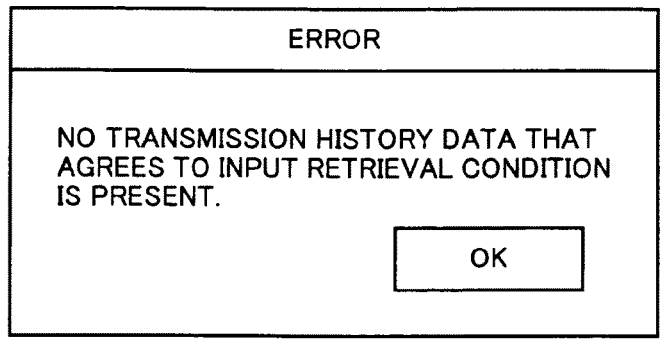
FIG. 16 depicts an example of an error screen displayed on the client PC.

FIG. 15 depicts another exemplary screen displayed when a history list of transmission histories is displayed on the client PC. In this case, an example is shown which, for the transmission histories of the history list shown in the above FIG. 5, the transmission histories obtained by retrieval of the history information retrieving portion 274 following the flow explained referring to FIG. 14 are displayed by classifying them using a tab 65 that is different from the tabs to 64. In the example, a transmission history including "0743" in its FAX number is extracted as new history data.

In the case where newly extracted history data is displayed being classified by using the new tab 65 as the result of the keyword retrieval, when the user operates the operating portion 26 and pushes the storage of the list button 54 on the transmission history screen 5 shown in the above FIG. 5, the list storage screen shown in the above FIG. 7 is displayed on the displaying portion 25. When the user operates the operating portion 26 and inputs the name of the tab 65 of the newly extracted history data, the history data creating portion 275 additionally creates a tab of the input name as shown in FIG. 15 (in this case, "addressed to 0743") and the display data control portion 277 displays this tab on the displaying portion 25.

As a variation of the above, the history data creating portion 275 may create thumbnail images by converting the image data of the transmission history obtained by retrieval of the history information retrieving portion 274 into thumbnails. In the example of FIG. 15, the transmission history displayed on the tab 65, namely, the image data of "job A2" and "job D" is displayed as thumbnail images.

FIG. 16 depicts an example of an error screen displayed on the client PC 2. This error screen is an error screen that is displayed at step S19 shown in the above FIG. 14 and the display data control portion 277 causes the displaying portion 25 to display this screen thereon when no transmission history that agrees to the input retrieval condition is present.

As above, a desired transmission history is able to be extracted from the transmission history information by inputting the retrieval condition and, therefore, the content can be recognized and processing such as re-transmission can be executed by collectively extracting the transmission history under the condition such as, for example, the time and date of transmission, the job name, and the FAX number.

Figure 17:
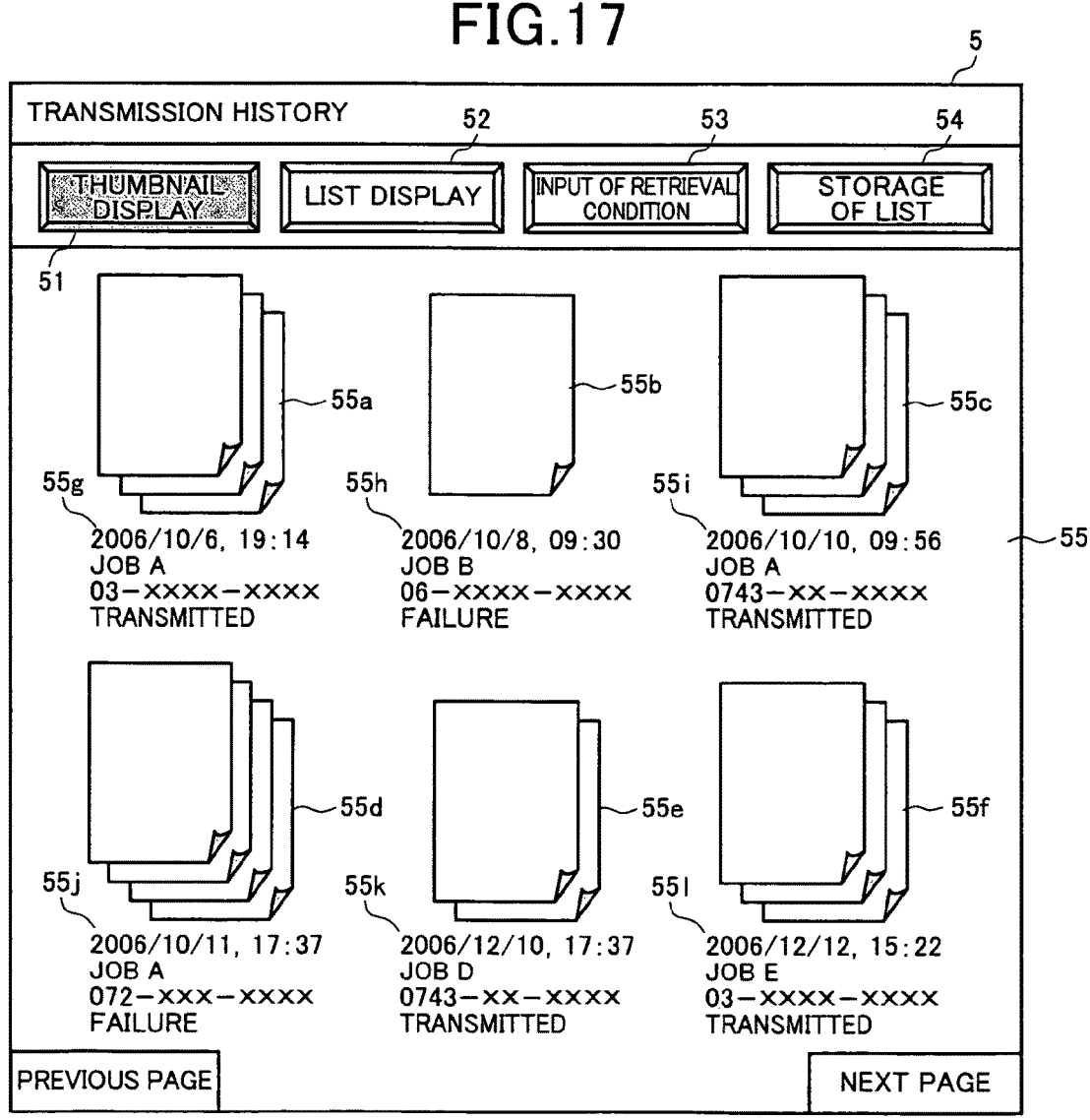
FIG. 17 depicts another exemplary screen displayed when the thumbnail images of the transmission history are displayed on the client PC.

FIG. 17 depicts another exemplary screen displayed when the thumbnail images of the transmission history are displayed on the client PC 2. As above, when the display data control portion 277 causes the thumbnail images created by the history data creating portion 275 to be displayed, the portion 277 is also able to cause the transmission history information that includes any one or more of the time and date of transmission, the job name, the destination information (such as the FAX number), and the transmission result of the image data corresponding to each thumbnail image, to be concurrently displayed. In the example of FIG. 17, the time and date of transmission, the job name, the FAX number, the transmission result, and the thumbnail image are concurrently displayed. By displaying the transmission history information together with the thumbnail image in this manner, the transmitted content is able to be more quickly found and recognized.

In the description given so far, the description has been given assuming that the image data is transmitted using the facsimile function of the MFP 4. However, the image data may be transmitted using the electronic mail function of the MFP 4. When the electronic mail is used for the transmission, the receiving party's apparatus may include no facsimile function and any apparatus that includes an electronic mail function such as a PC is able to receive.

Figure 18:
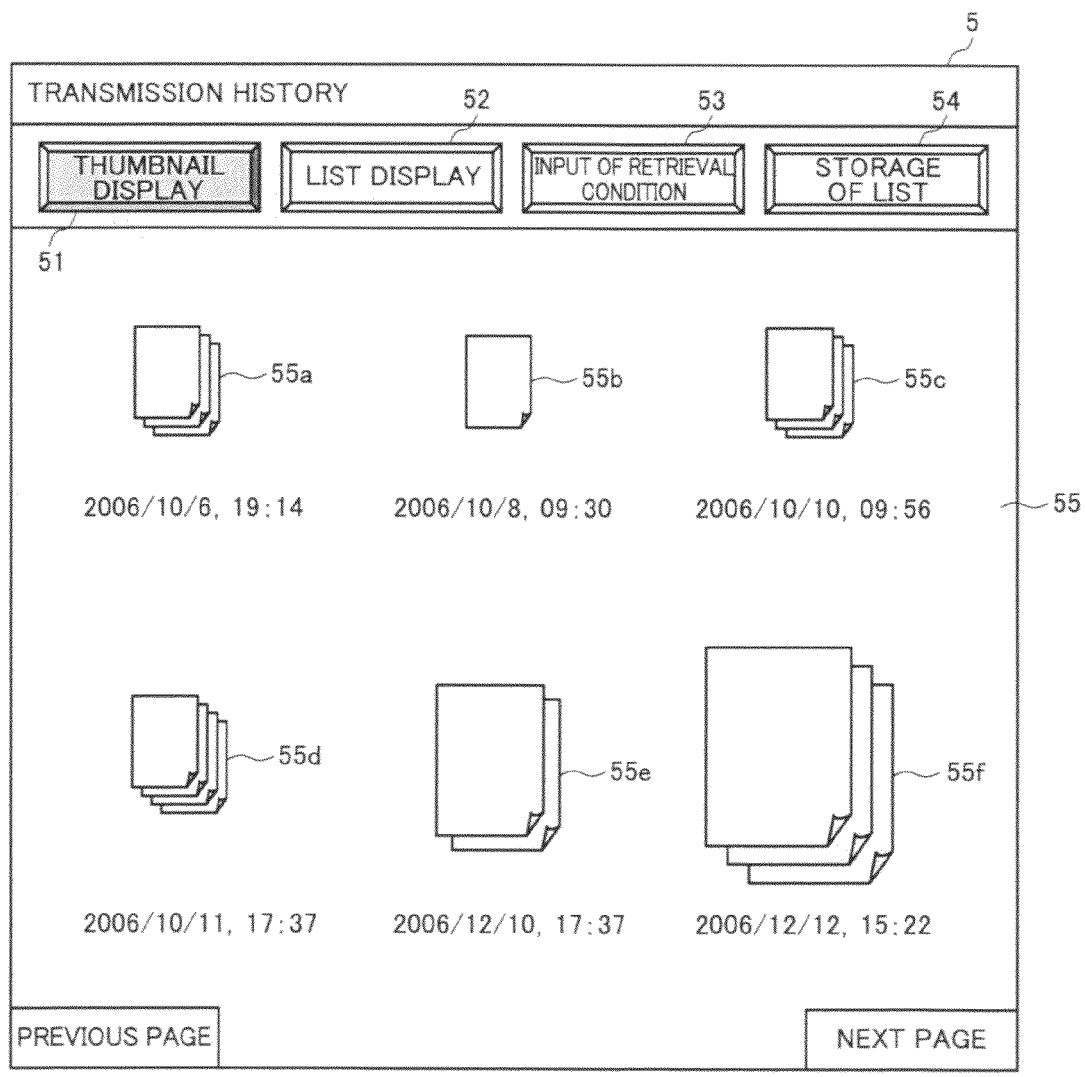
FIG. 18 depicts another exemplary screen displayed when the thumbnail images of the transmission history are displayed on the client PC.

For another example, the size of each thumbnail image to be displayed may be varied based on the information of the time and date of transmission. For example, as shown in FIG. 18, a user is able to easily identify the content of the latest transmission job by sequentially expanding one after another the size of the thumbnail images starting from the thumbnail image having the latest time and date of transmission.

The thumbnail image selected by the user may be enlarged to display. By enlarging the thumbnail image selected by the user to display, the content thereof can be easily identified.

As above, description has been given for the embodiments mainly for the functions of the information processing system of the present invention. However, the present invention is able to take the form of a history information displaying method as described as a method of executing steps in the information processing system. The form of a program to realize the history information displaying function as an information processing apparatus in the information processing system or a program to work the history information displaying method using the information processing apparatus, or the form as a recording medium that has the program stored thereon is possible.

Description will be made of an embodiment of a recording medium that has recorded thereon a program and data to realize the history information displaying function according to the present invention. Specifically, any one of a CD-ROM (-R/-RW), a magneto-optical disc, a DVD-ROM (-R/-RW/-RAM), an FD, an HD, a BD, a flash memory, a memory card, a memory stick, and other media such as various ROMs and RAMs are able to be assumed as the recording media. By recording on any one of these media the program to cause a computer to execute the functions of each of the above embodiments of the present invention and by distributing the program, realization of the functions is facilitated. The history information displaying function according to the present invention can be realized in the manner that the information processing apparatus such as a computer reads the program from the recording medium attached to it or the information processing apparatus reads the program stored in the recording medium installed in it as the occasion demands.

The present invention enables the following effect.

The present invention enables, when a transmission history such as a FAX job is displayed, quick retrieval of specific information from the transmission histories can be realized by displaying images included in the transmission history as thumbnails or by classifying the transmission history in a history list to display according to a specific condition such as the transmission result.

The invention claimed is:

1. An information processing system comprising an image forming apparatus that comprises a function of transmitting image data, and an information processing apparatus that instructs the image forming apparatus to transmit the image data, both of which are connected through a network, wherein
the information processing apparatus comprises:
a transmission history storing portion that stores, for each transmission history job, a transmission history that includes image data which the information processing apparatus instructs the image forming apparatus to transmit;
a history data creating portion that creates a thumbnail image by converting the image data of the stored transmission history into a thumbnail; and
a display data control portion that causes the thumbnail image created by the history data creating portion to be displayed;
wherein, in the case where the display data control portion causes the thumbnail image created by the history data creating portion to be displayed, the display data control portion causes, when a first piece of the image data that corresponds to the thumbnail image is a cover letter, only thumbnail images of a second piece and following pieces of image data to be displayed.

2. The information processing system as defined in claim 1, wherein
the history data creating portion makes a history list of information concerning the transmission history stored in transmission history storing portion, and
the display data control portion, when the display data control portion causes the history list created by the history data creating portion to be displayed, causes the transmission histories of the history list to be displayed by classifying them according to the state of the transmission result.

3. The information processing system as defined in claim 2, wherein
the display data control portion causes the transmission histories of the history list to be displayed by classifying them using a tab for each transmission result state of the transmission history.

4. The information processing system as defined in claim 2, wherein
the display data control portion causes the transmission histories of the history list to be displayed by coloring them differently according to each transmission result state of the transmission history.

5. The information processing system as defined in claim 2, wherein
the transmission result state is the state that the image forming apparatus succeeded or failed to transmit the image data.

6. The information processing system as defined in claim 5, wherein
the display data control portion causes, together with the history list, a re-transmission key that enables re-transmission of the image data that the image forming apparatus failed to transmit, to be displayed.

7. The information processing system as defined in claim 5, wherein
the display data control portion causes, together with the history list, a transmission destination changing key that enables transmission of the image data that the image forming apparatus succeeded to transmit by changing the transmission destination to another transmission destination, to be displayed.

8. The information processing system as defined in claim 2, wherein
the information processing apparatus comprises a transmission history retrieving portion that retrieves a transmission history of the history list based on any one or more of the time and date of transmission, the job name, destination address information, and the transmission result as the retrieval condition(s).

9. The information processing system as defined in claim 8, wherein
the display data control portion causes the transmission history acquired by retrieval of the transmission history retrieving portion to be displayed by classifying it using another tab that is different from the above described tab.

10. The information processing system as defined in claim 8, wherein
the history data creating portion creates a thumbnail image by converting the image data of the transmission history acquired by retrieval of the transmission history retrieving portion into a thumbnail.

11. The information processing system as defined in claim 1, wherein
the image forming apparatus transmits the image data by facsimile.

12. The information processing system as defined in claim 1, wherein
the image forming apparatus transmits the image data by e-mail.

13. The information processing system as defined in claim 1, wherein
- the information processing apparatus is a server apparatus that is connected to a plurality of client terminals through the network, and
- the display data control portion causes a displaying portion of any one of the client terminals to display the thumbnail image or the history list created by the history data creating portion in response to a request to display the transmission history from the client terminal.

14. A non-transitory, computer readable recording medium storing a program for causing a computer to function as an information processing system comprising an image forming apparatus that comprises a function of transmitting image data, and an information processing apparatus that instructs the image forming apparatus to transmit the image data, wherein both apparatuses are connected through a network, by
- acquiring and storing, for each transmission job, a transmission history that includes the image data that the information processing apparatus instructs the image forming apparatus to transmit;
- creating a thumbnail image by converting the image data of the acquired transmission history into a thumbnail; and
- causing the created thumbnail image to be displayed;
- wherein, when a first piece of the image data that corresponds to the thumbnail image is a cover letter, only thumbnail images of a second piece and following pieces of image data are caused to be displayed.

15. A history information displaying method for an information processing system comprising an image forming apparatus that comprises a function of transmitting image data, and an information processing apparatus that instructs the image forming apparatus to transmit the image data, both apparatuses are connected through a network, comprising the steps of:
- acquiring, for each transmission job, a transmission history that includes the image data that the information processing apparatus instructs the image forming apparatus to transmit;
- creating a thumbnail image by converting the image data of the acquired transmission history into a thumbnail; and
- causing the created thumbnail image to be displayed;
- wherein, when a first piece of the image data that corresponds to the thumbnail image is a cover letter, only thumbnail images of a second piece and following pieces of image data are caused to be displayed.

* * * * *